United States Patent [19]

Hattori et al.

[11] 4,357,919

[45] Nov. 9, 1982

[54] IGNITION TIMING CONTROL APPARATUS FOR INTERNAL COMBUSTION ENGINES

[75] Inventors: Tadashi Hattori, Okazaki; Hiroaki Yamaguchi, Anjo; Yoshinori Ootsuka, Okazaki, all of Japan

[73] Assignee: Nippon Soken, Inc., Nishio, Japan

[21] Appl. No.: 178,281

[22] Filed: Aug. 15, 1980

[30] Foreign Application Priority Data

Sep. 21, 1979 [JP] Japan .................................. 54-122364

[51] Int. Cl.³ ............................................. F02P 5/14
[52] U.S. Cl. .................................. 123/425; 123/416; 123/479
[58] Field of Search ............... 123/425, 479, 494, 416, 123/417; 73/35

[56] References Cited

U.S. PATENT DOCUMENTS

| | | | |
|---|---|---|---|
| 3,834,361 | 9/1974 | Keely | 123/479 |
| 3,948,228 | 4/1976 | Luchaco | 123/479 |
| 4,236,491 | 12/1980 | Hattori et al. | 123/425 |
| 4,245,591 | 1/1981 | Nishida et al. | 123/416 |
| 4,274,381 | 6/1981 | Abo | 123/479 |
| 4,275,692 | 6/1981 | Takeda | 123/425 |
| 4,290,301 | 9/1981 | Yamaguchi et al. | 73/35 |

Primary Examiner—P. S. Lall
Attorney, Agent, or Firm—Cushman, Darby & Cushman

[57] ABSTRACT

An ignition timing control apparatus for internal combustion engines is constructed to retard or advance the spark time of an engine when a knocking detector in the ignition timing control apparatus detects the occurrence or non-occurrence of knocking in the engine, respectively, and to retard the spark time by a predetermined angular value irrespective of an output signal from the knocking detector when a failure occurring in the knocking detector has been detected. Further, the ignition timing control apparatus may comprise alarm means which is actuated when a failure occurring in the knocking detector has been detected.

8 Claims, 13 Drawing Figures

IGNITION TIMING CONTROL APPARATUS FOR INTERNAL COMBUSTION ENGINES

BACKGROUND OF THE INVENTION

1. Field of the Invention

This invention relates to an ignition timing control apparatus for internal combustion engines operating to detect knocking occurring in an internal combustion engine (hereinafter referred to simply as an engine) by the vibrations, sounds or the like generated inside and outside the cylinders of the engine due to the elevated pressure of burning gases in the cylinders of the engine and to adjust the spark time of the engine so that knocking may be kept down within a predetermined magnitude.

2. Description of the Prior Art

It is generally known that there is a close relation between the spark time and the burning gas pressure in each of the combustion chambers of an engine. The pressure in the combustion chamber when a mixture gas burns therein without causing knocking contains no high frequency waves (which are caused by intermittent and rapid combustion of a mixture gas and have frequency components normally ranging from 5 KHz to 10 KHz which belong to a frequency band determined by the bore of the engine cylinder and the sound velocity in the burning gas). However, once knocking has started to appear, such high frequency waves begin to appear approximately at the moment of occurrence of the maximum burning gas pressure in a combustion chamber, which causes vibrations or sounds to be transmitted to the outside of the engine cylinders. Upon studying the state of the generation of internal pressure signals in the engine cylinders or that of the vibrations or sounds transmitted to the outside of the engine cylinders, it is seen that initial knocking (trace knocking) begins to appear from a crank angle of the engine where the burning gas pressure in the combustion chamber becomes maximum, and, as knocking is promoted gradually (to the extent called light or heavy knocking), a greater amount of high frequency waves come to appear preceding the maximum pressure point in the combustion chamber (namely, toward the point of the spark time). Therefore, it is possible to have the efficiency of an engine elevated greatly, if such vibrations or sounds caused by knocking and transmitted to the outside of the engine cylinders can be picked up with high precision and fed back to control the ignition timing of the engine. In doing so, it is necessary to obtain a knocking detector which can detect with high precision the state of knocking, which is an important factor to be fed back, and can operate stably under severe environmental conditions which the engine-mounted vehicle would encounter. If the knocking detector should fall into any abnormal state such as wire breakage, electrical leakage, breakdown or the like, an output signal of the knocking detector would almost always disappear in such a case, so that the spark time would continue to be advanced even under a knocking condition, due to the misjudgement that no knocking has ever occurred. Under such a condition, heavy knocking would occur, and not only the driving performance of the vehicle would be deteriorated, but also there could arise a disastrous problem such as the destruction of the engine.

SUMMARY OF THE INVENTION

In view of the above-mentioned problem, a first invention of this application provides an ignition timing control apparatus for internal combustion engines comprising a knocking detector and means for detecting a failure occurring in the knocking detector which makes it possible to prevent excessive knocking, which may cause an engine to be destroyed, even when a failure occurs in the knocking detector, by effecting ignition timing control for assuring safety, namely, by retarding the spark time by a predetermined crank angle regardless of an output signal from the knocking detector when the failure detecting means judges that such a failure has occurred in the knocking detector.

A second invention of this application provides an ignition timing control apparatus for internal combustion engines further comprising an alarm device such as a buzzer, lamp, etc. in addition to the constitutional elements of the first invention which warns an operator of the engine of a failure occurring in the knocking detector when the failure detecting means judges that such a failure has occurred and initiates the operation of the alarm device.

BRIEF DESCRIPTION OF THE DRAWING

FIG. 4b is a timing diagram which provides, as an example, a comparative illustration of the relation of crank angles in the advance angle correcting operations effected by the respective ignition advance angle operating circuits embodying this invention shown in FIGS. 3 and 8 with respect to both cases that the knocking detector is operating normally and a failure has occurred in the knocking detector. FIG. 4b also shows, as an example, the delay time $\tau_1$ preset to follow the spark time, the pulse signal of the time width $\tau_2$ indicative of the preset time interval for anticipating the occurrence of knocking therewithin, and the knocking detecting signal of the time width $\tau_3$.

DESCRIPTION OF THE PREFERRED EMBODIMENTS

An explanation will be given hereunder of an embodiment of this invention in conjunction with the accompanying drawings.

Figure 1:
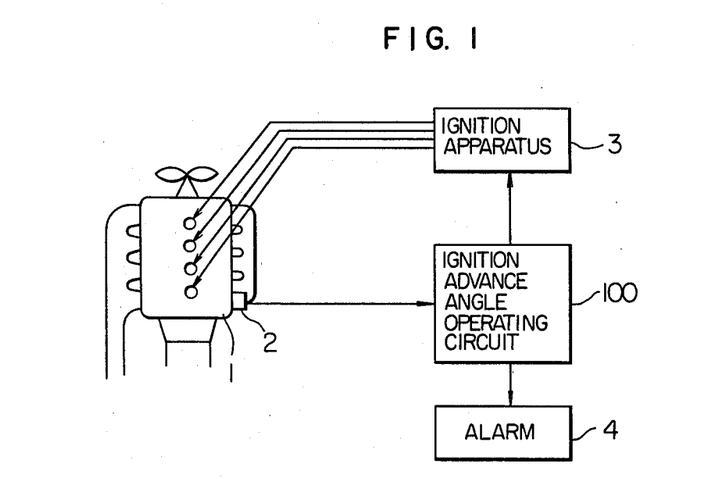
FIG. 1 is a schematic general structural drawing showing an example of the ignition timing control apparatus for internal combustion engines embodying this invention.

FIG. 1 is a schematic general structural drawing showing the ignition timing control apparatus embodying this invention. In FIG. 1, numeral 1 designates a four-cylinder in-line internal combustion engine. A knocking detector 2 is fixed onto a cylinder block portion of the engine 1 by means of screw threads, etc. provided thereon. Numeral 100 designates an ignition advance angle operating circuit which comprises a knocking detecting circuit for detecting knocking occurring in the engine by an output signal from the knocking detector 2 and a knocking detector failure detecting circuit for detecting a failure occurring in the knocking detector 2 and operates to control the ignition timing at an optimum point by advancing or retarding the spark time in response to output signals from both circuits. Output signals of the ignition advance angle operating circuit 100 are sent to a publicly known ignition apparatus 3 thereby to ignite a mixture gas supplied into the engine 1 by means of spark plugs mounted on the engine 1. Numeral 4 designates alarm means including a lamp, buzzer, etc. actuated by a signal from the knocking detector failure detecting circuit.

Figure 2A:
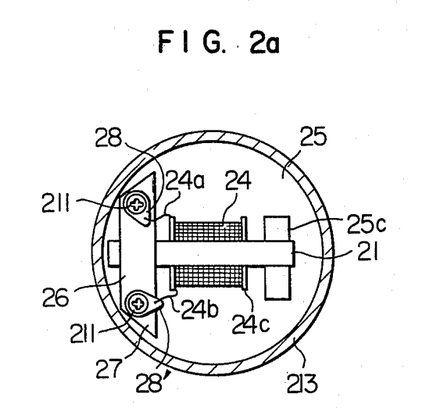
FIGS. 2a and 2b are drawings of cross section and longitudinal section, respectively, showing an example of the knocking detector in the apparatus shown in FIG. 1.
Figure 2B:
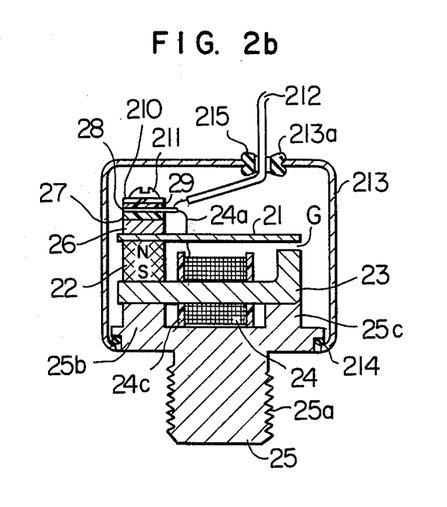

Next, a detailed explanation will be given of the knocking detector 2. Referring to FIGS. 2a and 2b, numeral 21 designates a reed strip made of a magnetic material (for example, iron or iron-nickel alloy) and having a resonance frequency which resonates with knocking frequencies ranging from five to ten KHz, numeral 22 a magnet exerting a magnetic force, and numeral 23 an L-shaped magnetic core made of a material such as iron, iron-nickel alloy, ferrite or the like and forming a magnetic path in cooperation with the reed strip 21 and the magnet 22. In the magnetic path there is provided an air gap G between the reed strip 21 and the magnetic core 23. Consequently, if the reed strip 21 vibrates, the length of the air gap G varies to change the magnetic reluctance of the magnetic path. Numeral 24 designates a coil for detecting the change of magnetic flux. Numeral 24c designates a coil bobbin having a center hole in which the magnetic core 23 is inserted and having winding conductors of the coil 24 wound on the outer side thereof. Further, the coil bobbin 24c is firmly attached to the magnetic core 23 by means of an adhesive or the like so as to prevent a change of the number of interlinkage of magnetic flux due to variations in the relative position of the coil 24 and the magnetic core 23. Numeral 25 designates a housing made of iron, brass or the like whose lower portion has a threaded portion 25a for mounting the knocking detector assembly onto the cylinder block of the engine 1 and whose upper portion has supporting portions 25b and 25c where the magnetic core 23 is fixed. Numeral 26 designates a holding bar for holding the member which forms the above-mentioned magnetic path. An end of the reed strip 21, the magnet 22, the magnetic core 23 along with insulating plates 27 and 29, lug plates 28 and 28' to which lead wires 24a and 24b of the coil 24 are connected, respectively, and a washer 210 are fixed firmly to the supporting portion 25b of the housing 25 with a screw 211. The lead wires 24a and 24b of the coil 24 are joined respectively to the lug plates 28 and 28' by soldering or caulking, and the output of the coil 24 is taken out through lead wires 212 connected to the lug plates 28 and 28'. Numeral 213 designates a cover fixed to the housing 25 by caulking with a sealing member 214 made of rubber or the like intervening therebetween. Numeral 213a designates a hole provided in the cover 213 through which the lead wires 212 are led out, and numeral 215 a rubber bushing member for supporting the lead wires 212 in the hole 213a. The knocking detector assembly is fixed firmly onto the cylinder block through the threaded portion 25a of the housing 25 so that the knocking detector 2 may vibrate together with the cylinder block of the engine 1.

Next, an explanation will be given of the operation of the knocking detector 2. Since the knocking detector 2 is fixed onto the cylinder block of the engine 1 by firmly screwing the threaded portion 25a of the housing 25 of the former into a tapped hole in the latter as described above, knocking vibrations appearing in the cylinder block are transmitted to the reed strip 21 via the housing 25. Since the reed strip 21 is fixed only at one end thereof, it would vibrate depending upon the frequency and amplitude of the knocking vibrations as well as according to its own natural frequency. The magnetic core 23, the coil 24 and the magnet 22 are firmly united with the housing 25 to vibrate with the latter, so that only the reed strip 21 is allowed to effect relative displacement in the magnetic path in response to knocking vibrations thereby causing the length of the air gap G to vary in response to knocking vibrations occurring in the cylinder block of the engine 1. Here, it is designed beforehand that the magnet 22 causes a predetermined amount of magnetic flux to pass through the magnetic core 23 and the reed strip 21 and that the variations of the length of the air gap G cause the variations of the amount of magnetic flux in the magnetic path. Thus, the coil 24 detects the variations of the amount of magnetic flux, namely, the amount of knocking vibrations to produce output voltages corresponding thereto. The detected voltage signal is transmitted through the lead wires 212 to the ignition advance angle operating circuit 100. The reed strip 21 is designed to have a fundamental resonance frequency generally in the vicinity of 8 KHz in contrast with the knocking frequency range (5 to 10 KHz), so that it is provided with knocking detection sensitivity which is raised especially in the frequency band mentioned above, whereas its sensitivity for signals in the other frequency bands is reduced, thereby providing the reed strip 21 with an elevated S/N ratio in the above-mentioned frequency band.

Figure 3:
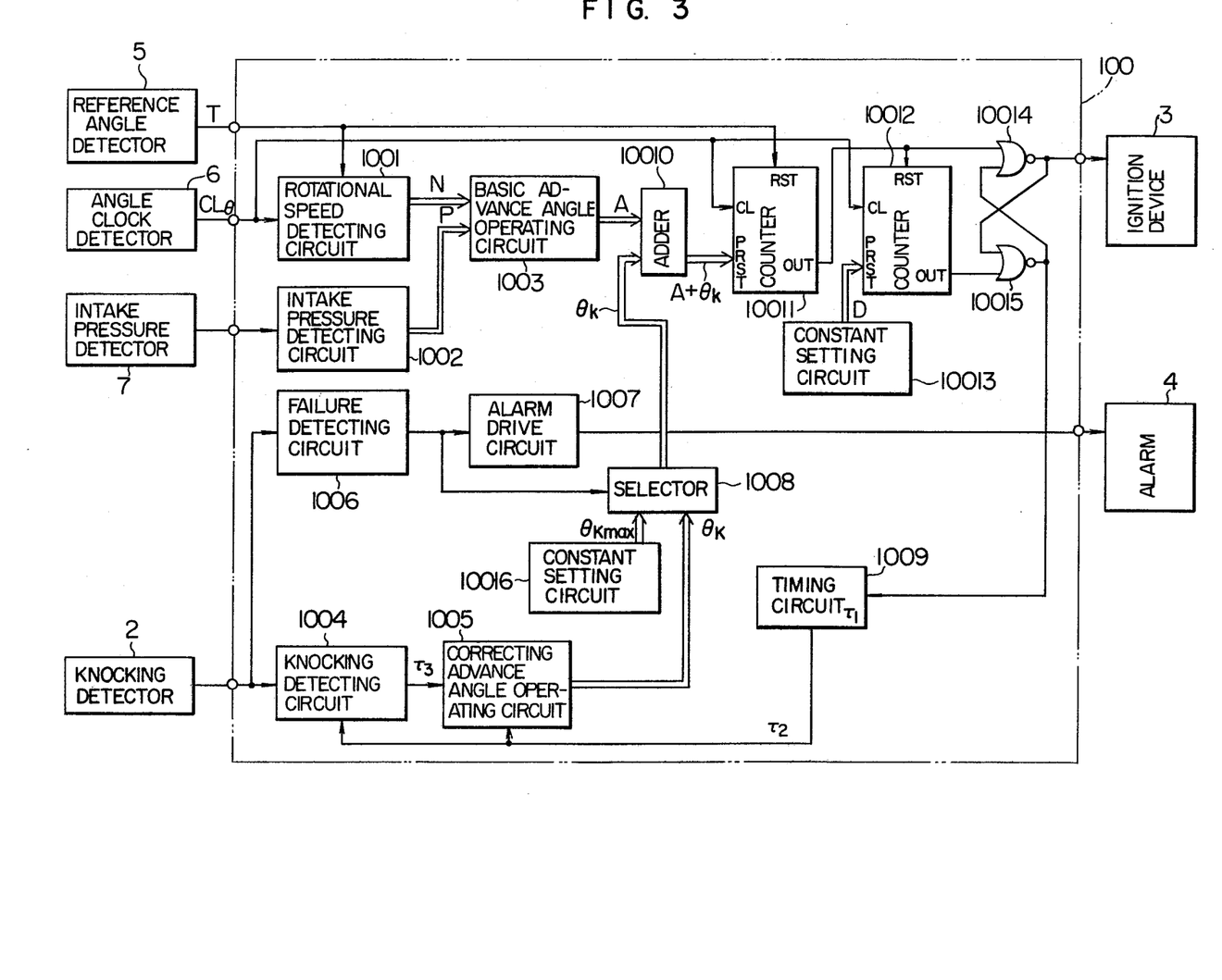
FIG. 3 is a block diagram showing an example of the detailed construction of the electric circuit of the apparatus shown in FIG. 1.

Next, an explanation will be given of an example of the ignition advance angle operating circuit 100 embodying this invention. In FIG. 3, numeral 5 designates a reference angle detector for generating signals T representing reference angles of the crankshaft of the engine 1 (a four-cylinder four-cycle internal combustion engine generates two reference angle signals at equal angular intervals per revolution). Numeral 6 designates an angle clock detector for detecting stepwise crank angle positions, for example, at crank angle intervals of 1°, and numeral 7 an intake pressure detector for detecting intake manifold pressure of the engine 1. The ignition advance angle operating circuit 100 includes a rotational speed detecting circuit 1001, an intake pressure detecting circuit 1002, a basic advance angle operating circuit 1003, a knocking detecting circuit 1004, a correcting advance angle operating circuit 1005, a timing circuit 1009, a failure detecting circuit 1006, an alarm drive circuit 1007, a constant setting circuit 10016, a selector 1008, an adder 10010, counters 10011 and 10012, another constant setting circuit 10013, and NOR circuits 10014 and 10015. The rotational speed detecting circuit 1001 receives output signals from the reference angle detector 5 and the angle clock detector 6 and detects rotational speeds of the engine 1. The intake pressure detecting circuit 1002 receives output signals from the intake pressure detector 7 and detects intake pressure of the engine 1. The basic advance angle operating circuit 1003 contains a read only memory (hereinafter referred to as ROM), and it receives, as its input signals, rotational speed signals N from the rotational speed detecting circuit 1001 and intake pressure signals P from the intake pressure detecting circuit 1002, and it has a program of basic advance angle values stored in the ROM in terms of delay angles (A) which are crankshaft angles delaying from the reference crankshaft angles represented by the reference angle signals T. The knocking detecting circuit 1004 detects the occurrence of knocking by receiving an output signal from the knocking detector 2. The correcting advance angle operating circuit 1005 computes correcting advance angle values ($\theta_k$) for correcting the basic advance angle values from the basic advance angle operating circuit 1003 by using an output signal from the knocking detecting circuit 1004. The timing circuit 1009 outputs respective timing signals for the knocking detecting circuit 1004 and the correcting advance angle operating circuit 1005. The failure detecting circuit 1006 decides whether there has occurred any failure in the knocking detector 2. The alarm drive circuit 1007 drives an alarm 4 such as a lamp, buzzer, etc. by an output signal from the failure detecting circuit 1006. The constant setting circuit 10016 has a constant correcting retard angle value set therein to be used when it has been decided that a failure has occurred in the knocking detector 2. The selector 1008 selects either an output signal of the constant setting circuit 10016 or that of the correcting advance angle operating circuit 1005 depending on an output signal from the failure detecting circuit 1006. The adder 10010 effects addition of a programmed basic advance angle value from the basic advance angle operating circuit 1003 and a correcting advance angle value supplied from the correcting advance angle operating circuit 1005 through the selector 1008. The constant setting circuit 10013 has the value of a coil energizing angle or dwell angle D in degrees set therein. The counter 10011 has a reset input terminal connected to an output terminal of the reference angle detector 5, a preset input terminal connected to an output terminal of the adder 10010, and an output terminal connected to an input terminal of a NOR circuit 10014, and it receives a clock input signal from the angle clock detector 6. The counter 10012 has a reset input terminal connected to the output terminal of the counter 10011, a preset input terminal connected to an output terminal of the constant setting circuit 10013, and an output terminal connected to an input terminal of a NOR circuit 10015, and it receives a clock input signal from the angle clock detector 6. The NOR circuits 10014 and 10015 constitute a flip-flop circuit which generates an output signal going out of the ignition advance angle operating circuit 100.

Figure 4A:
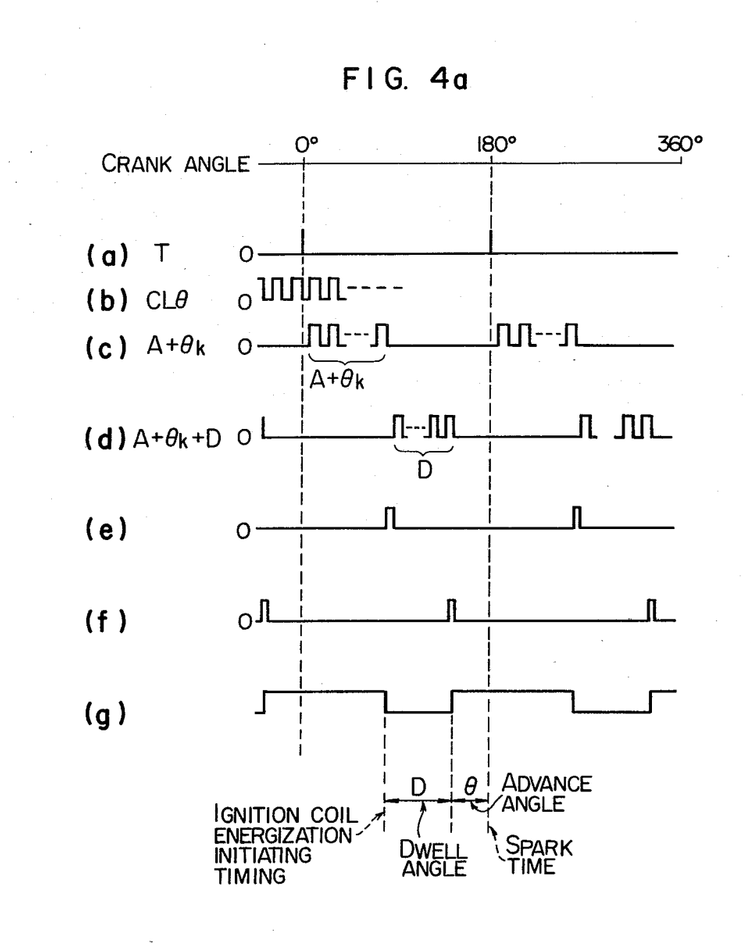
FIG. 4a is a waveform diagram illustrating the operations effected at the various portions of the electric circuit shown in FIG. 3.
Figure 5:
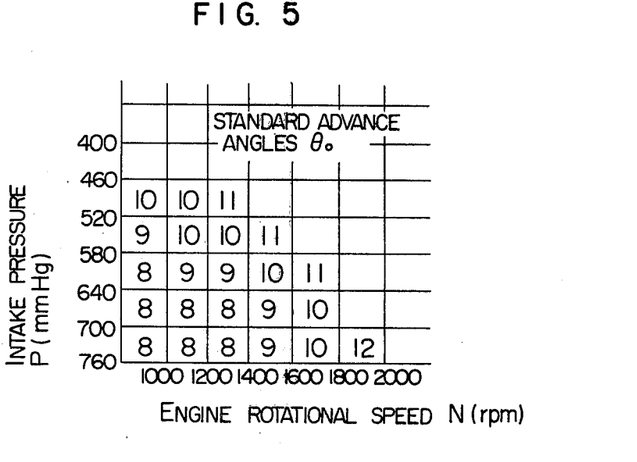
FIGS. 5 and 6 are a spark time program diagram and a delay angle program diagram, respectively, for use in the electric circuit shown in FIG. 3.
Figure 6:
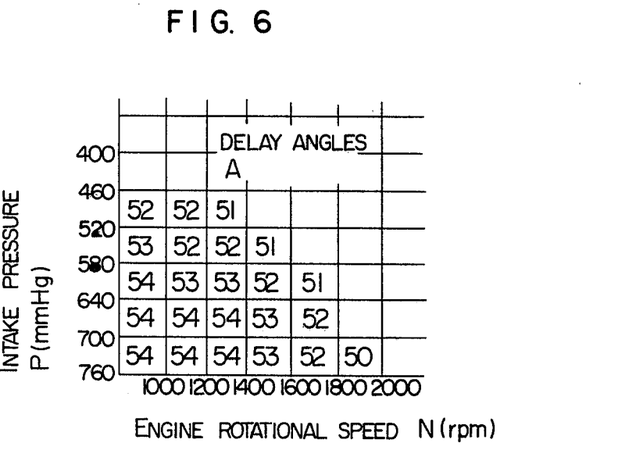

Next, an explanation will be given of the operation of a portion of the ignition timing control apparatus of this invention other than the portion thereof comprising the failure detecting circuit 1006, the alarm drive circuit 1007, the selector 1008, the constant setting circuit 10016, the knocking detecting circuit 1004, the correcting advance angle operating circuit 1005 and the timing circuit 1009 by making reference to the waveform diagram of FIG. 4a. The reference angle detector 5 generates, at the top dead center (TDC) of each of the cylinders of the engine 1, reference angle signals T (twice per revolution of the crankshaft) as shown at FIG. 4a(a). The angle clock detector 6 generates angle signals $CL_\theta$ at every degree of the angle of rotation of the crankshaft (1° CA) as shown at FIG. 4a(b). In the basic advance angle operating circuit 1003, a ROM stores basic advance angle values which are represented in terms of angle values delaying from a reference rotational position of the crankshaft and are determinable in accordance with engine rotational speed signals N from the rotational speed detecting circuit 1001 and intake pressure signals P from the intake pressure detecting circuit 1002. More precisely, by taking account of standard advance angles $\theta_o$ which have been predetermined corresponding to the respective combinations of the engine rotational speed signals N and the intake pressure signals P as shown in FIG. 5, a reference angle position (the crankshaft angle 180° is used here), a standard value $\theta_{ko}$ for the correcting advance angles ($\theta_k$) set in the correcting advance angle operating circuit 1005 ($\theta_{ko} = 10°$ CA is assumed in this case) and a dwell angle D (for example, 108° CA), delay angles A given by the equation $A = 180 - \theta_o - \theta_{ko} - D = 62 - \theta_o$ as shown in FIG. 6 are stored in the ROM. By way of examples, the ROM stores a program in a way such that: if the intake pressure P is 760 to 700 mmHg and the engine rotational speed N is 1200 to 1400 rpm, then $\theta_o = 8°$ BTDC results from FIG. 5, and consequently A = 54° is given by the above equation; if N is 1400 to 1600 rpm, $\theta_o = 9°$ BTDC and then A = 53° results; if N is 1600 to 1800 rpm, $\theta_o = 10°$ BTDC and then A = 52° results; if the intake pressure P is 580 to 520 mmHg and the engine rotational speed N is 1200 to 1400 rpm, then $\theta_o = 10°$ BTDC results, and consequently A = 52° is obtained; if N is 1400 to 1600 rpm, $\theta_o = 11°$ BTDC results, and then A = 51° is obtained; and so on. Here, the finer the values in the program are divided, the higher the precision of the angle values is raised, on the other hand, greater capacity of the ROM is required. In this case, it is possible to reduce the capacity of the ROM if an interpolation method is applied between the programmed points in the ROM. For example, referring to the above-mentioned examples, the interpolation may be effected by taking A = 54° when N = 1200 rpm and A = 50° when N = 1800 rpm in the range of P = 760–700 mmHg and conducting the operation of $$A = \frac{50 - 54}{1800 - 1200} \times \Delta N + 54,$$

where $\Delta N$ = (a detected rotational speed $N_x$) − 1200. Then, a delay angle A from the basic advance angle operating circuit 1003 and a correcting angle $\theta_k$ from the selector 1008 are added together in the adder 10010, and the resultant (A + $\theta_k$) is supplied to a preset input to the counter 10011. The counter 10011 is supplied with the angle signals $CL_\theta$ from the angle clock detector 6 and starts to count the angle signals $CL_\theta$ every time the reference angle signals T from the reference angle detector 5 are applied to a reset input thereto as shown at FIG. 4a(c). When the counter 10011 completes the counting of the angle signals $CL_\theta$ whose number represents the value of $(A+\theta_k)$ [hereinafter abbreviated as the count $(A+\theta_k)$], the output of the counter 10011 becomes "1" level as shown at FIG. 4a(e). The "1" level output signal is sent to an input to a NOR circuit 10014 composing a flip-flop to trigger it and at the same time the same output signal is applied to the reset input to the counter 10012. The counter 10012 is supplied with the angle signals $CL_\theta$, and it starts to count the angle signals $CL_\theta$ upon receipt of the "1" level output signal from the counter 10011 at its reset input terminal. As described hereinbefore, the constant setting circuit 10013 has the value of a coil energizing angle or dwell angle D set therein and supplies the dwell angle signal D to a preset input to the counter 10012. When the counting of the counter 10012 reaches the count D as shown at FIG. 4a(d), the output of the counter 10012 becomes a "1" level as shown at FIG. 4a(f), and its "1" level output signal is sent to an input to a NOR circuit 10015 composing the flip-flop to trigger it. Output signals from the NOR circuit 10014 shown at FIG. 4a(g) are sent to the ignition apparatus 3. Here, the moment that the output of the counter 10012 becomes a "1" level as shown at FIG. 4a(f) is the spark time, and the moment that the output of the counter 10011 becomes a "1" level as shown at FIG. 4a(e) is the ignition coil energization initiating timing, and the ignition coil energizing angle or dwell angle D shown at FIGS. 4a(d) and 4a(g) is the angle value D set in the constant setting circuit 10013.

Figure 4B:
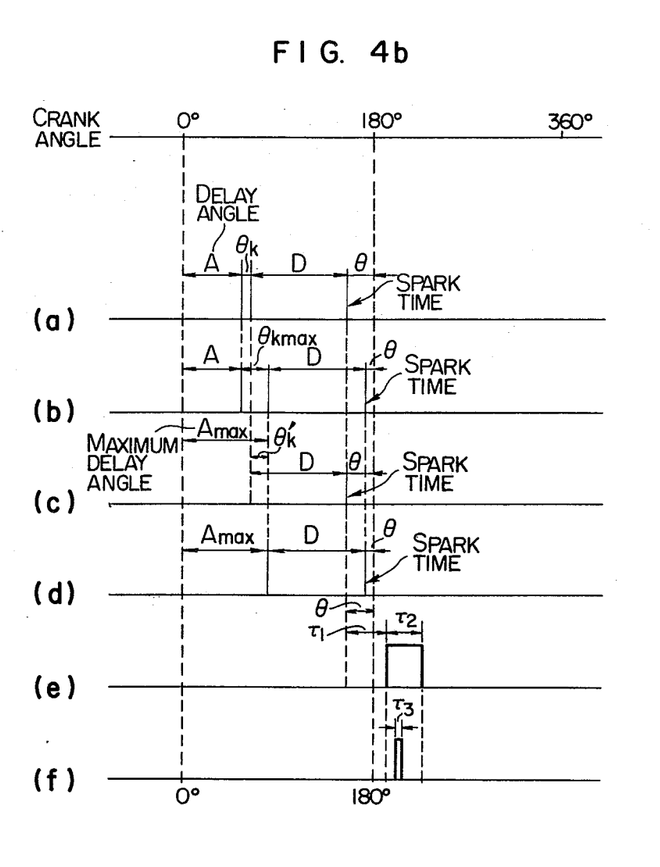

FIG. 4b shows, as an example, the relation of crank angles in the advance angle correcting operations effected by the ignition advance angle operating circuit 100 as well as the state of the generation of a knocking detecting signal of the time width $\tau_3$ and a pulse signal of the time width $\tau_2$ indicative of a preset time interval for anticipating the occurrence of knocking therewithin. In FIG. 4b, FIG. 4b(a) corresponds to the illustration of FIG. 4a and shows the advance angle correcting operation by the use of a correcting advance angle $\theta_k$ supplied through the selector 1008 from the correcting advance angle operating circuit 1005 in the ignition advance angle operating circuit 100 in FIG. 3 when the knocking detector 2 is operating normally. FIG. 4b(b) shows an advance angle correcting operation by the use of a maximum delay angle $\theta_{kmax}$ supplied through the selector 1008 from the constant setting circuit 10016 in FIG. 3 when a failure has occurred in the knocking detector 2, as will be described later. FIG. 4b(c) shows a case where an advance angle correcting operation is effected by the use of a correcting advance angle $\theta_k'$ supplied through a gate circuit 1008a from the correcting advance angle operating circuit 1005 to correct a maximum delay angle $A_{max}$ programmed in the basic advance angle operating circuit 1003 in another ignition advance angle operating circuit embodying this invention shown in FIG. 8 when the knocking detector 2 is operating normally, as will be described later. FIG. 4b(d) shows a case where an advance angle correcting operation is effected in the ignition advance angle operating circuit shown in FIG. 8 only by the maximum delay angle $A_{max}$ supplied from the basic advance angle operating circuit 1003 without using a correcting advance angle from any other portion of the ignition advance angle operating circuit when a failure has occurred in the knocking detector 2, as will also be described later. FIG. 4b(e) shows, as an example, the relation between a delay time $\tau_1$ given by the timing circuit 1009 shown in FIGS. 3 and 8 and described as follows and the pulse signal of the time width $\tau_2$ indicative of a preset time interval for anticipating the occurrence of knocking therewithin. FIG. 4b(f) shows, as an example, a knocking detecting signal of the time width $\tau_3$ generated by a monostable circuit 1054 shown in FIG. 9 and described later as being contained in the knocking detecting circuit 1004 shown in FIGS. 3 and 8.

Figure 9:
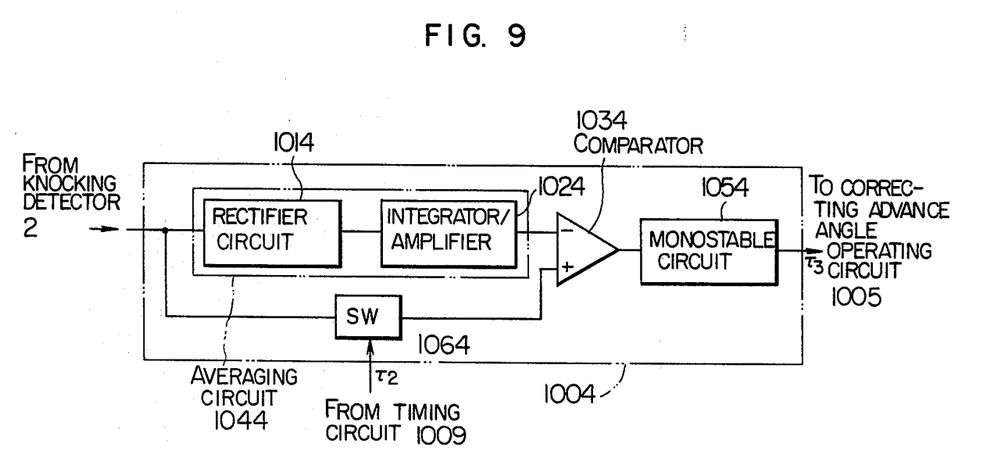
FIG. 9 is an electric circuit diagram showing an example of the detailed structure of the knocking detecting circuit in the electric circuit shown in FIG. 3.
Figure 10:
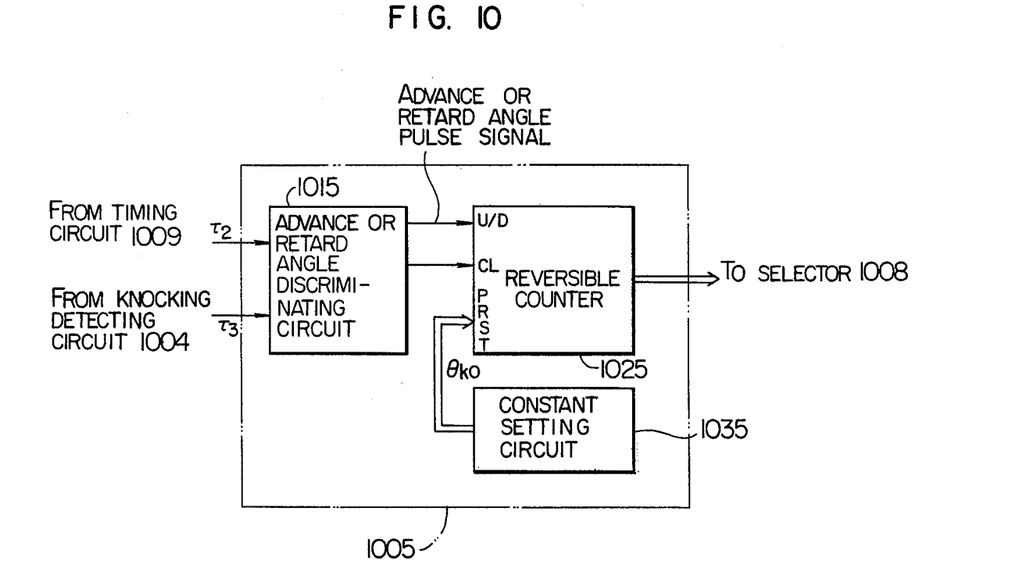
FIG. 10 is an electric circuit diagram showing an example of the detailed structure of the correcting advance angle operating circuit in the electric circuit shown in FIG. 3.

Next, the operations of the timing circuit 1009, the knocking detecting circuit 1004, and the correcting advance angle operating circuit 1005 will be described in the following. The timing circuit 1009 shown in FIG. 3 receives an output signal of the NOR circuit 10015 as an input signal thereto. The timing circuit 1009 comprises two monostable circuits and generates a pulse signal of the time width $\tau_2$ after the lapse of the time $\tau_1$ from the rise point of an ignition spark pulse. In FIG. 9 showing the construction of the knocking detecting circuit 1004, numeral 1044 designates an averaging circuit comprising a half-wave or full-wave rectifier circuit 1014 and an integrator/amplifier circuit 1024 which has a relatively large time constant (extending at least over a time period corresponding to several crankshaft revolutions) and integrates peak values of signals rectified through the rectifier circuit 1014. With such a construction, the averaging circuit 1044 produces an output signal representing average values of all vibratoins occurring in the engine. The knocking detecting circuit 1004 is comprised of the above-described averaging circuit 1044, a comparator 1034 which compares the output signal of the averaging circuit 1044 with the output signal of the knocking detector 2, and a monostable circuit 1054. Here, the integrator/amplifier circuit 1024 operates to multiply an input signal thereto by a predetermined multiplication factor $(K_1)$, and thus the integrator/amplifier circuit 1024 outputs average values of normal engine vibrations including noise signals multiplied by $K_1$. The magnitude of the output signal of the integrator/amplifier circuit 1024 is compared with that of the knocking detector 2 in the comparator 1034. If the magnitude of the direct output signal from the knocking detector 2 is greater than that of the output signal of the averaging circuit 1044, the comparator 1034 produces an output signal and thereby triggers the monostable circuit 1054, thus causing the latter to produce a knocking detecting signal of the time width $\tau_3$ [refer to FIGS. 4b(e) and (f)]. On the contrary, if the magnitude of the direct output signal from the knocking detector 2 is smaller than that of the output signal of the averaging circuit 1044, the comparator 1034 does not produce any trigger signal, so that the monostable circuit 1054 remains untriggered and produces no output signal. The direct output signal from the knocking detector 2 contains noise signals due to vibrations of intake and exhaust valves of the engine 1 occurring upon closing of the valves (whose frequencies are just the same as those of knocking vibrations). If it is desirable to eliminate such undesirable noise signals, instead of applying the output signal of the knocking detector 2 directly to an input to the comparator 1034, an analog switch 1064 controlled by the timing circuit 1009 may be inserted between the output of the knocking detector 2 and the input to the comparator 1034 thereby to eliminate the noise signals by effecting the masking of the noise signals (by intercepting the transfer of such noise signals from the knocking detector 2 to the comparator 1034)

during a predetermined angular interval of the crankshaft rotation. The provision of such analog switch 1064 may improve the performance of the apparatus of this invention. Next, reference is made to FIG. 10 which shows the detailed construction of the correcting advance angle operating circuit 1005. In FIG. 10, an advance or retard angle discriminating circuit 1015 in the correcting advance angle operating circuit 1005 receives a pulse signal of the time width $\tau_2$ from the timing circuit 1009 and a knocking detecting signal of the time width $\tau_3$ from the knocking detecting circuit 1004 as input signals thereto. While an input pulse signal of the time width $\tau_2$ is present, if there is received no knocking detecting signal, the circuit 1015 outputs an advance angle pulse signal (a down-signal of "0" level and a clock signal of one pulse), and on the other hand, if there is received a knocking detecting signal while the input pulse signal of the time width $\tau_2$ is present, the circuit 1015 outputs a retard angle pulse signal (an up-signal of "1" level and a clock signal of four pulses). The correcting advance angle operating circuit 1005 is comprised of the advance or retard angle discriminating circuit 1015, a reversible counter 1025 which receives the advance or retard angle pulse signal as an input signal thereto, and a constant setting circuit 1035. In the reversible counter 1025 there is initially set a standard value $\theta_{ko}$ for correcting advance angles which is supplied from the constant setting circuit 1035 (here, $\theta_{ko}$ is set at 10° for example). At every retard angle pulse signal received, the reversible counter 1025 effects the up-counting of four pulses (1° CA), while, at every advance angle pulse signal received, the reversible counter 1025 effects the down-counting of one pulse (0.25° CA), for example. Namely, the output correcting advance angle value increases from its initial standard value $\theta_{ko}$ (10°) at a higher rate upon receipt of retard angle pulse signals. On the other hand, it decrease at a lower rate upon receipt of advance angle pulse signals. (Here, the ratio of the down-counting rate to the up-counting rate is taken as 1:4.) The above reversible counting is conducted every time ignition is effected. Here, the time width $\tau_1$ is set by the timing circuit 1009 to extend over the period from the spark time to the generation of a flame core (usually about 1 msec after the spark time). Further, the time width $\tau_2$ is predetermined to extend over the period from the expiration of the time width $\tau_1$ to the generation of knocking as the combustion of a mixture gas progresses thereafter in the engine cylinder. The setting of such time widths assures accurate and stable detection of the occurrence or non-occurrence of knocking. Since normal engine vibrations increase generally as the rotational speed of the engine rises, and besides they vary according to the level of the intake pressure, the above-described method enables the detection of knocking in a broad range of engine operating conditions.

Figure 7:
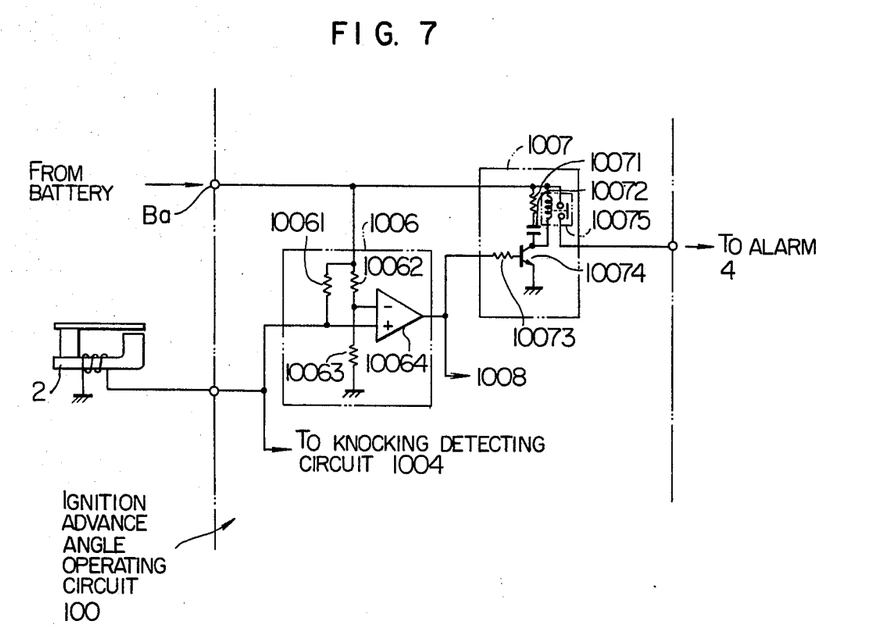
FIG. 7 is an electric circuit diagram showing an example of the detailed structure of the failure detecting circuit in the electric circuit shown in FIG. 3.

Next, the failure detecting circuit 1006, the alarm drive circuit 1007, the selector 1008 and the constant setting circuit 10016 will be described by making reference to FIG. 7. The failure detecting circuit 1006 is constituted by resistors 10061, 10062 and 10063 and a comparator 10064. The symbol Ba designates a power supply terminal for connection to a power source battery. A weak electric current is constantly supplied to the electric circuit of the knocking detector 2 through the resistor 10061. Usually, the impedance of the knocking detector 2 is very low, so that the output signal from the knocking detector 2 is supplied directly to a non-inverting input terminal of the comparator 10064. However, if a failure such as wire breakage occurs in the knocking detector 2, the electric potential of an end of the resistor 10061 on the side opposite to the power source side is raised to the power supply voltage to cause the comparator 10064 to output a "1" level signal. The resistors 10062 and 10063 are voltage dividing resistors for determining an upper limit value for the comparison reference voltage. The alarm drive circuit 1007 comprises an input resistor 10073, a resistor 10071 and a capacitor 10072 connected in series for absorbing a counter-electromotive force, a transistor 10074 and a relay 10075. When the output signal of the failure detecting circuit 1006 becomes a "1" level, the transistor 10074 becomes conductive to energize the relay 10075 in the alarm drive circuit 1007 thereby to drive the alarm 4 including a lamp, a buzzer, etc. Namely, if there occurs a failure such as wire breakage in the knocking detector 2, the alarm 4 is actuated to produce an alarm signal. On the other hand, the output signal of the failure detecting circuit 1006 is also sent to an input to the selector 1008 as a "select" input signal thereto. The selector 1008 selects either an output signal of the constant setting circuit 10016, in which a maximum correcting retard angle value has been set, or that of the correcting advance angle operating circuit 1005. When the output signal of the failure detecting circuit 1006 becomes a "1" level, the maximum correcting retard angle value set in the constant setting circuit 10016 is selected and enters the adder 10010, on the other hand, when the output signal of the failure detecting circuit 1006 becomes a "0" level, the output correcting advance angle value from the correcting advance angle operating circuit 1005 is selected and enters the adder 10010. Thus, when it has been judged that a failure has occurred in the knocking detector 2, the maximum retardation of the spark time is effected by using a predetermined retard angle value, irrespective of an output signal from the correcting advance angle operating circuit 1005. On the other hand, when it has been judged that the knocking detector 2 is operating normally, the spark time is feedback-controlled by the correcting advance angle value computed by the correcting advance angle operating circuit 1005 in accordance with the output signal of the knocking detector 2 [refer to FIGS. 4b(a) and (b)].

Figure 8:
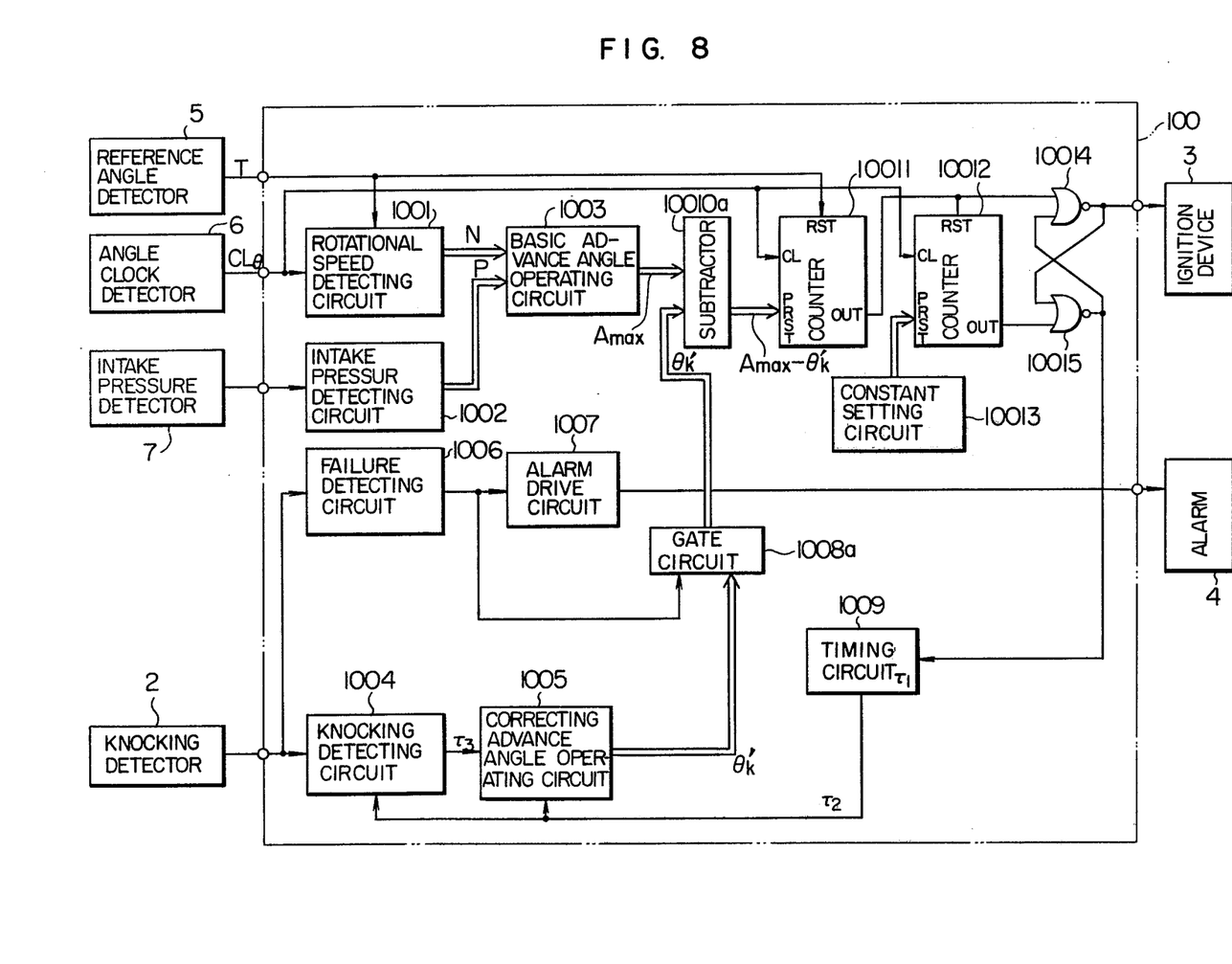
FIG. 8 is a block diagram showing another example of the detailed structure of the electric circuit of the apparatus shown in FIG. 1.

The embodiment of this invention shown in FIG. 8 provides another ignition timing control apparatus having a program stored in the ROM of the basic advance angle operating circuit 1003 thereof which program contains maximum delay angle values in place of the delay angle values programmed in the basic advance angle operating circuit 1003 of the embodiment of this invention shown in FIG. 3. In this case, ignition advance angle values are obtained by subtracting the correcting advance angle value computed by the correcting advance angle operating circuit 1005 in accordance with the output signal of the knocking detector 2 from the basic advance angle value supplied by the basic advance angle value supplied by the basic advance angle operating circuit 1003. In the above-mentioned arrangement shown in FIG. 8, it is not necessary to provide a constant setting circuit 10016 shown in FIG. 3 having a suitable correcting retard angle value set therein which is to be used when a failure has occurred in the knocking detector 2, but instead a signal from the failure detecting circuit 1006 may be used to effect the correction of the basic advance angle value. In this case, a gate circuit 1008a may be used in place of the selector 1008 to be closed when a failure has occurred in the knocking detector 2, and to be opened when the knocking detector 2 is operating normally, and at the same time a subtractor 10010a may be used in place of the adder 10010. The other arrangement of the embodiment shown in FIG. 8 is identical with that shown in FIG. 3 [refer to FIGS. 4b(c) and (d)]. Further, though the circuit shown in FIG. 8 has been designed to perform digital operations, the circuit may be easily constructed also by using analog circuits which utilize the charge-and-discharge operations of a capacitor or the like. In addition, the input parameter to the basic advance angle operating circuit 1003 may be solely engine rotational speeds, and further the same operational mechanism may be used when another parameter such as an air suction rate or the like is used.

Figure 11:
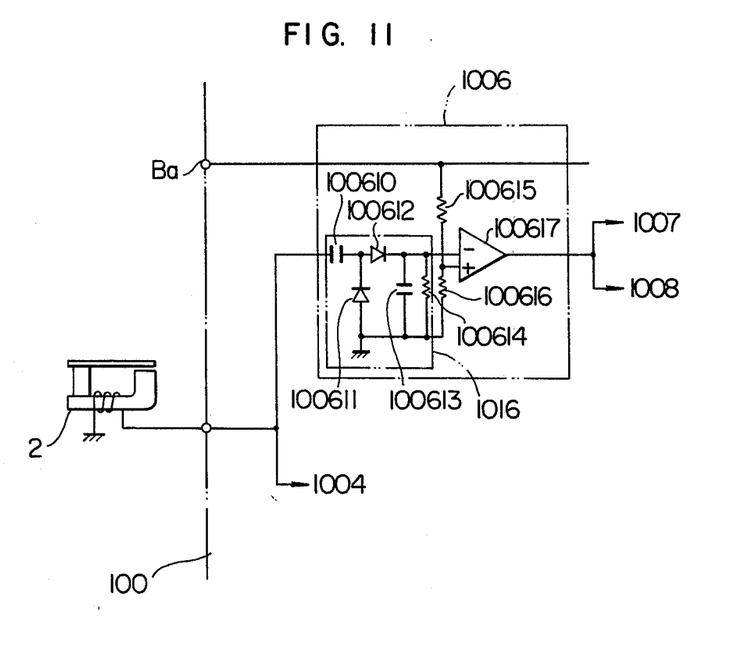
FIG. 11 is an electric circuit diagram showing another example of the detailed structure of the failure detecting circuit in the electric circuit shown in FIG. 3.

FIG. 11 shows another exemplifying embodiment of the failure detecting circuit 1006. The failure detecting circuit 1006 shown in FIG. 11 operates to detect the occurrence of a failure when either short-circuit (leakage) or wire breakage has taken place in the knocking detector 2. It is certain that the knocking detector 2 outputs an ac signal, since, while the engine is operating, the engine gives rise to at least normal vibrations acting as a noise signal. However, once a failure such as shortcircuit or wire breakage takes place, the knocking detector 2 produces an output signal of a constant level. The failure detecting circuit 1006 in FIG. 11 makes use of the above-mentioned principle. The failure detecting circuit 1006 is comprised of capacitors 100610 and 100613, diodes 100611 and 100612, resistors 100614, 100615 and 100616, and a comparator 100617. The output signal of the knocking detector 2 is rectified and integrated by the rectifier and integrator circuit 1016 which is constituted by the components other than the voltage dividing resistors 100615 and 100616 and the comparator 100617 in the failure detecting circuit 1006, thereby producing an analog signal whose magnitude is approximately proportional to the amplitudes of the ac components of the output signal of the knocking detector 2. Here, the value of a reference input dc voltage to the comparator 100617, which is predetermined by the voltage dividing resistors 100615 and 100616, is made lower than the integrated value of the output signal of the rectifier and integrator circuit 1016 which represents the magnitude of the normal engine vibrations. If the magnitude of an output signal of the rectifier and integrator circuit 1016 is smaller than the value of the reference input dc voltage to the comparator 100617, the output signal of the comparator 100617 becomes a "1" level to act as a failure signal. On the contrary, if the former is greater than the latter, the output signal of the comparator 100617 becomes a "0" level to act as a normal operation signal. Further, the output signal of the averaging circuit 1044 of the knocking detecting circuit 1004 shown in FIG. 9 may be put to combined use instead of using the rectifier and integrator circuit 1016. In this case, it is possible to detect only a short-circuit (leakage) failure occurring in the knocking detector 2. Moreover, when the averaging circuit 1044 is used, if the failure detecting circuit 1006 shown in FIG. 7 is used in combination therewith in place of the circuit shown in FIG. 11, it is possible to discriminate whether a failure occurring in the knocking detector 2 has been caused by the breakage of an electric wire or by a short-circuit (leakage) occurring in the knocking detector 2.

Thus, it becomes possible to identify the cause of a failure more accurately.

The foregoing explanation of the knocking detector 2 has been made on an electromagnetic type knocking detector. It is possible, however, to use a piezoelectric type knocking detector, and the above-described two exemplifying failure detecting circuits may also be applicable thereto. However, in this case the output impedance of a piezoelectric element contained in the knocking detector is high, so that it becomes necessary to effect impedance matching by the use of an emitter follower circuit, an amplifier circuit or the like circuit to make the same circuits as above described also applicable to this case.

We claim:

1. An ignition timing control apparatus for internal combustion engines comprising:
    a knocking detector for detecting vibrations corresponding to a knocking phenomenon occurring in an engine and for producing an output signal responsive thereto;
    a knocking detecting circuit for detecting a knocking condition of said engine in response to said output signal from said knocking detector and for producing a detection signal responsive thereto;
    a correcting advance angle operating circuit for retarding and advancing the ignition timing of said engine in response to said detection signal from said knocking detecting circuit which indicates the occurrence and non-occurrence of knocking, respectively;
    failure detecting means for detecting the occurrence of a failure in said knocking detector in accordance with said output signal thereof; and
    ignition timing retarding means for retarding the ignition timing by predetermined angular value irrespective of the output signal from said knocking detector when said failure detecting means has detected the occurrence of a failure in said knocking detector.

2. An ignition timing control apparatus for internal combustion engines as defined in claim 1, wherein said failure detecting means includes means for causing a weak electric current to flow through the electric circuit of said knocking detector and means for monitoring the continuation of the weak electric current flow.

3. An ignition timing control apparatus for internal combustion engines as defined in claim 1, wherein said failure detecting means includes means for integrating the value of the output signal voltage of said knocking detector.

4. An ignition timing control apparatus for internal combustion engines as defined in any of claims 1, 2 and 3, wherein said ignition timing retarding means includes a constant setting circuit having a maximum retard angle value set therein and a selector for selecting the maximum retard angle value set in said constant setting circuit when said failure detecting means has detected the occurrence of a failure in said knocking detector and for selecting an output value of said correcting advance angle operating circuit when said failure detecting means does not detect the occurrence of any failure in said knocking detector.

5. An ignition timing control apparatus for internal combustion engines as defined in any of claims 1, 2 and 3, further comprising a gate circuit which is closed when said failure detecting means has detected the occurrence of a failure in said knocking detector and which is opened to pass the output signal from said correcting advance angle operating circuit when said failure detecting means does not detect the occurrence of any failure in said knocking detector.

6. An ignition timing control apparatus for internal combustion engines comprising:
   a knocking detector for detecting vibrations corresponding to a knocking pehnomenon occurring in an engine and for producing an output signal responsive thereto;
   a knocking detecting circuit for detecting a knocking condition of said engine in response to said output signal from said knocking detector and for producing a detection signal responsive thereto;
   a correcting advance angle operating circuit for retarding and advancing the ignition timing of said engine in response to said detection signal from said knocking detecting circuit which indicates the occurrence and non-occurrence of knocking, respectively;
   failure detecting means for detecting the occurrence of a failure in said knocking detector in accordance with said output signal thereof;
   ignition timing retarding means for retarding the ignition timing by a predetermined angular value irrespective of the output signal from said knocking detector when said failure detecting means has detected the occurrence of a failure in said knocking detector; and
   alarm means being actuated when said failure detecting means has detected the occurrence of a failure in said knocking detector.

7. An ignition timing control apparatus for internal combustion engines comprising:
   a knocking detector for detecting vibrations corresponding to a knocking pehnomenon occurring in an engine and for producing an output signal responsive thereto;
   means for detecting the operating condition of said engine;
   means responsive to said output signals of said knocking detector and said engine operating condition detecting means for controlling the engine ignition timing, said engine ignition timing controlling means including;
   means for determining the ignition timing in accordance with the output signal of said engine operating condition detecting means;
   knocking detecting means for detecting a knocking condition of said engine in response to said output signal from said knocking detector and for producing a detection signal responsive thereto;
   correcting means for retarding and advancing the ignition timing of said engine in response to said detection signal from said knocking detecting means which indicates the occurrence and non-occurrence of knocking, respectively;
   failure detecting means for detecting the occurrence of a failure in said knocking detector in accordance with the output signal of said knocking detector; and
   ignition timing retarding means for retarding the ignition timing by a predetermined angular value irrespective of said output signal of said knocking detector when said failure detecting means has detected the occurrence of a failure in said knocking detector.

8. An ignition timing control apparatus according to claim 7, further comprising alarm means being actuated when said failure detecting means has detected the occurrence of a failure in said knocking detector.

* * * * *